Figure 1:
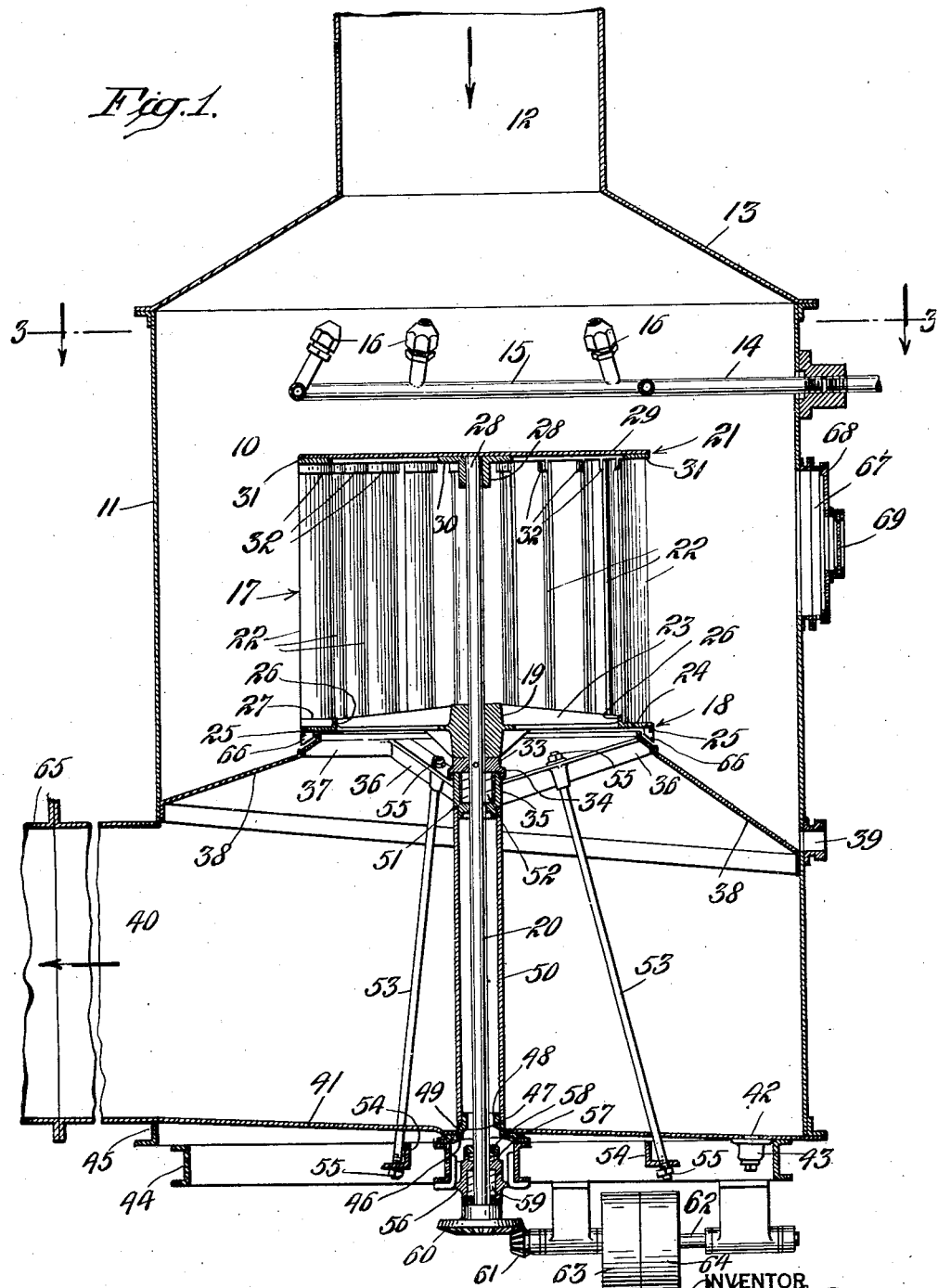

Feb. 21, 1933.    J. S. BARNES    1,898,807
AIR CLEANING
Filed Oct. 22, 1930    2 Sheets-Sheet 1

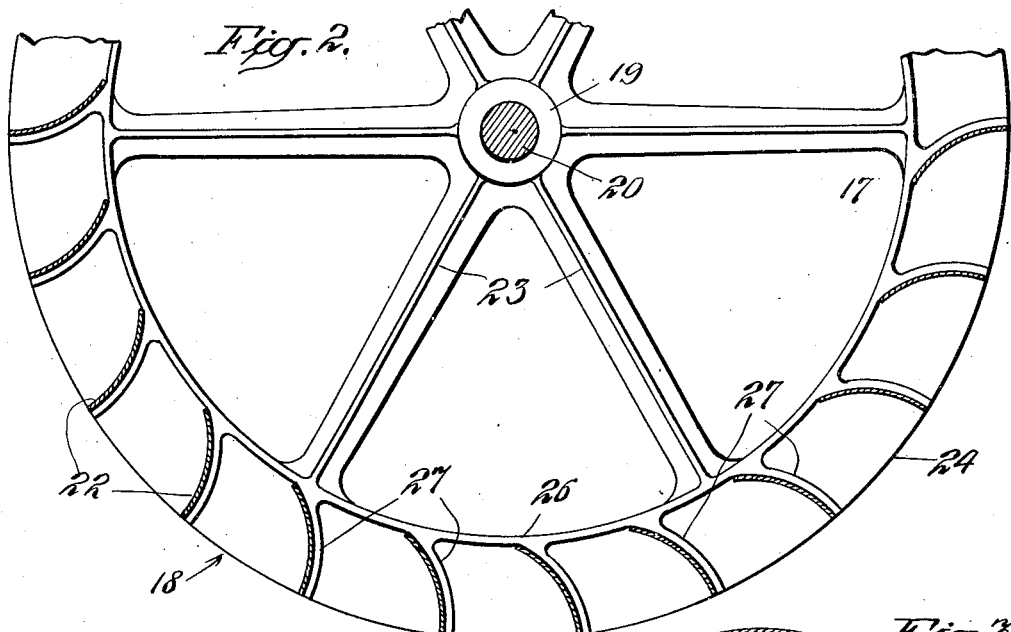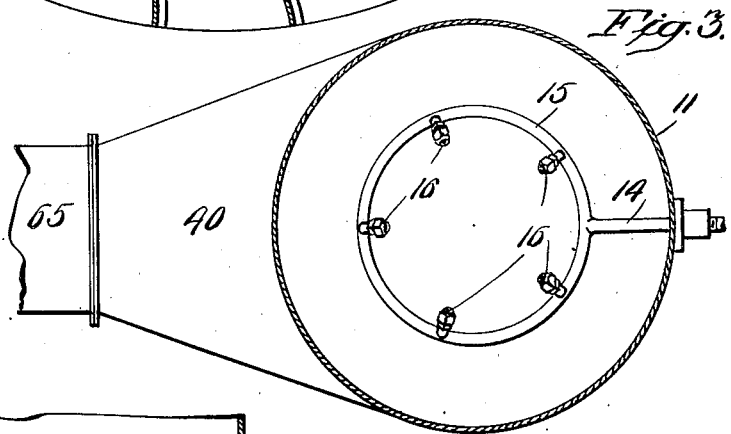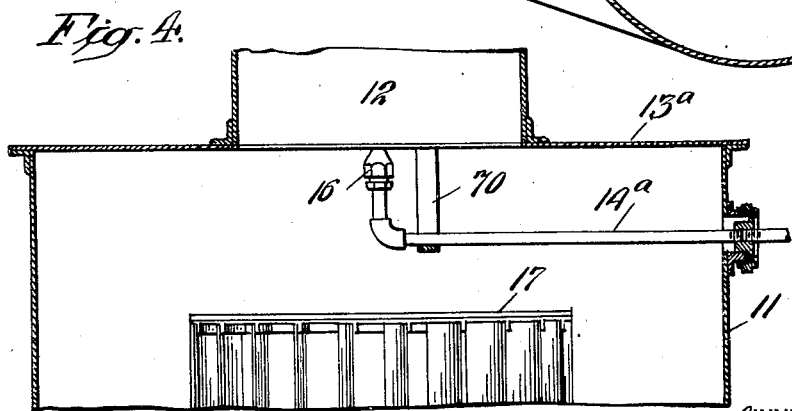

Patented Feb. 21, 1933

1,898,807

UNITED STATES PATENT OFFICE

JOHN STETSON BARNES, OF WHITE PLAINS, NEW YORK, ASSIGNOR, BY MESNE ASSIGNMENTS, TO THE BORDEN COMPANY, OF NEW YORK, N. Y., A CORPORATION OF NEW JERSEY

AIR CLEANING

Application filed October 22, 1930. Serial No. 490,358.

This invention relates to improvements in air cleaning and more particularly to an improved method of and apparatus for washing air and removing particles therefrom.

Many difficulties are encountered in attempting to remove fine dust or powder from air and in many cases the greatest difficulties arise from the nature of the material suspended in the air. For example, in manufacturing powdered milk, the milk is sprayed into a current of heated air, whereupon the milk spray is dried substantially instantaneously and converted into powder which contains some very fine particles. Heretofore, as much of the powder as possible has been removed from the current of heated air by settling under the action of gravity, baffling devices being sometimes used to supplement the settling action. There has been, however, a considerable loss of powder due to the fact that some of the particles are too fine to be removed by the settling and baffling operations. The percentage of loss is substantial and where large quantities of milk are converted into powder the loss in powder and in money value is considerable. No satisfactory solution of recovering such fine particles from the air has heretofore been found.

One object of the present invention is to provide a method of air cleaning which will meet the requirements specified and will be efficient and suitable for air cleaning in general. Another object is to provide means for air cleaning which will meet the specified requirements and be efficient in operation and suitable for air cleaning in general. To this end the invention resides in the method of and apparatus for air cleaning hereinafter fully described and particularly pointed out in the appended claims.

The preferred form of apparatus for practising the method of the invention is illustrated in the accompanying drawings in which Fig. 1 is a central vertical section of the improved air cleaning apparatus; Fig. 2 is a horizontal section of the rotary separator device of Fig. 1; Fig. 3 is a horizontal section taken along the line 3—3 of Fig. 1, certain parts being omitted; and Fig. 4 is a central vertical section of the upper part of a modified form of apparatus.

The improved apparatus as illustrated in the drawings comprises a casing into which the powder or dust laden air is directed and from which the clean air is discharged after the dust or powder has been removed, means for moistening the air, as by spraying, upon entrance of the air into the casing, means for separating the particles of moisture and moistened powder from the air by impact and centrifugal force, means for discharging the separated material, and means for discharging the cleaned air. It should be understood that under ordinary circumstances the coarse dust or powder is removed, as by settling and/or baffling, before the apparatus and method of the present invention are brought into use.

More specifically the improved apparatus includes a separation chamber 10 enclosed by a cylindrical casing 11, and the air laden with fine powder or dust after removal of the coarse powder is directed downwardly into this chamber through a central vertical duct or inlet 12 connecting with a central opening in a member 13 serving as a cover or top for the casing 11 and corresponding in shape with the lateral surface of a frustum of a cone.

As the powder laden air enters the top of the chamber and spreads in passing through member 13, it is subjected to a spraying and washing operation. As shown in Fig. 1, the liquid for such spraying is introduced through the side of the casing 11 into a pipe 14 which is supported in the casing wall in any suitable manner and communicates at its inner end with a hollow ring 15 provided at its upper side with a plurality of spray or atomizer heads 16 which are preferably inclined inwardly. It will be evident that the atomizer heads are so arranged as to tend to split the air current and divert it towards the peripheral wall of the chamber.

Beneath the spraying device is a rotary separating device or separator 17 which, in many respects, resembles the rotor of a fan and includes a lower end in the form of a spider 18 having a hub 19 mounted on a vertical shaft 20, an upper end 21 also mounted on the shaft 20, and blades 22 extending between said ends. The spider 18 includes, in addition to the hub 19, spokes 23 and a rim 24 in the general form of an annular plate having at its outer edge a downwardly projecting flange 25 and at its inner edge an upwardly extending flange 26 from which curved ribs 27 extend across the upper surface of the rim. The upper end 21 of the separator includes a hub 28 fixed on the upper end of shaft 20, a circular plate 29 secured to a flange 30 on the upper end of the hub 28, and an annular plate 31 secured to the plate 29 at its lower side and corresponding in dimensions with the rim 24 of the spider 18. The annular plate 31 is provided on its lower side with curved ribs 32 corresponding in shape and position with the ribs 27 on the rim 24 at the lower end of the separator. The curvature of the ribs 27 and 32 is the same as the transverse curvature of the blades or vanes 22 and the ends of the blades are secured to said ribs in any suitable manner, as by soldering.

The hub 19 of the spider 18 rests on an annular member 33 pinned to the shaft 20 and having a downwardly extending flange 34 fitting around the cylindrical upper end of a hub 35 provided with outwardly and upwardly extending arms 36 carrying a rim or ring 37 of which the upper edge is close to the lower side of the rim 24 of the lower end of the separator 17. The rim 37 has an intermediate part shaped like the lateral surface of a frustum of a cone, a lower part in the form of a downwardly extending cylindrical flange of about the same external radius as the rim 24 of the lower end of the rotary separator, and an upper part in the form of an upwardly extending cylindrical flange of such radius as to be positioned about midway between the inner and outer edges of the rim 24. The rim or ring 37 serves as a central support for a floor 38 which is in the general form of the surface of a frustum of a cone extending from the ring 37 to the side wall of the casing 11 but is distorted so that it joins the side wall at a relatively high point on one side and at a relatively low point on the other side, so that liquid or moist material falling on the floor will drain to such low point from which it may be discharged through a suitable outlet 39.

Beneath the floor 38, which may be called a drainage floor, the casing 11 is provided with a relatively large outlet 40 through which the clean air drawn through the rotary separator is discharged. Preferably the air outlet 40 is at the opposite side from the liquid discharge outlet 39 and is of such diameter as to extend from the lower edge of a flange provided at the outer edge of the floor 38 to the bottom 41 of the casing, which bottom slopes downwardly from said outlet 40 to the opposite side of the casing where said bottom 41 is provided with an outlet 42 through which moisture and liquid, collecting in the bottom of the casing, may be removed. The outlet 42 is, of course, closed ordinarily, and may be controlled by any suitable device 43.

The entire structure is mounted on a frame 44, here shown as made of channel material. The bottom 41 of the casing 11 rests directly on the frame 44 at one side and the inclined arrangement of the bottom 41 is maintained by means including an arc-shaped member 45. Supported by the frame 44 is a central member 46 having a round central portion 47 projecting upwardly through an opening in the bottom of the casing and having at the base of said central portion an annular support for the central part of said bottom. The member 46 also has a reduced central portion 48 above the central portion 47 and an annular shoulder 49 at the lower end of said reduced portion. Fitting over the reduced portion 48 and resting on the shoulder 49 is the lower end of a tubular member or support 50, which at its upper end fits over the reduced lower end of the hub 35 and engages a downwardly facing shoulder 51 at the upper end of said reduced lower end of the hub, thereby serving to support the hub 35, the arms 36 and the rim 37. The hub 35 is also supplied with a suitable anti-friction bearing 52.

To provide sufficient support against lateral movement of the upper end of the shaft 20, the frame including the hub 35, the arms 36 and the rim 37, is connected with the frame 44 by suitable means such as tie rods 53 passing at their upper ends through openings in the arms 36 and at their lower ends through members 54 secured to the frame 44, tension being applied to the rods by means of nuts 55 screwed on the ends of said tie rods. Preferably the tie rods 53 are inclined outwardly from their upper ends to their lower ends. It will be evident that where the tie rods 53 pass through the bottom 41 of the casing there should be a close fit or seal.

Also supported by the frame 44 is a member 56 of which the upper end serves as the lower part of a thrust bearing 57 of which an upper member 58 is secured to the shaft 20 and serves to support the same and consequently the rotary separator 17. The member 56 is also provided with an antifriction bearing 59 which supports the lower end of the shaft against sidewise movement. Rotation of shaft 20 may be effected by means of a bevel gear 60 attached to the lower end thereof and meshing with a bevel gear 61 on a countershaft 62 provided with a fast pulley 63 and a loose pulley 64.

Although the rotary separator 17 resembles a fan (see Fig. 2), its separating action is effected by rotating it in a direction to oppose the current of air which passes downwardly through the duct 12 into the chamber 10, inwardly through the spaces between the vanes 22 to enter the interior of the separator 17, downwardly through the spider 18 to the portion of the casing 11 beneath the floor 38, and outwardly through the outlet 40. Such flow of air through the apparatus may be produced by suitable means including a suction fan 65 connected with the outlet 40. As shown in Fig. 1, the rim 24 at the lower end of the rotary separator is provided at its lower side with members or blades 66 of which the lower edges are close to the inclined surface of the conical portion of the rim 37 supporting the central part of the floor 38. These blades tend to keep the inclined surface clear and to prevent the inward passage of air between the lower end of the separator and the floor.

In order to get the best results, the speed of rotation of the separator 17 should be such that each blade will travel a distance equal to the distance between two successive blades in at least as short a time as the air takes in traveling from the outside of the separator to the inside thereof through the spaces between the blades or vanes 22. By thus regulating the speed of rotation of the separator with reference to the air current, it is made certain that all particles of moisture or moistened powder which enter the space between successive blades 22 will be engaged by the concave surface of the vane at the rear side of such space and will be thrown outwardly, for example, by impact with the vane, or by such impact in connection with centrifugal force, or will adhere to the vane and collect until a sufficient mass has accumulated, whereupon such mass will be thrown outwardly by centrifugal force and eventually will fall upon the wall or the sloping floor and slide or flow down the same to the outlet 39 through which it will be discharged.

The casing 11 of the apparatus may be of considerable size and for convenience in cleaning is provided with a manhole 67 having a cover 68. For convenience in inspecting the interior of the casing, the cover 68 may be provided with an inspection window 69.

A recapitulation of the steps of the air cleaning operation will now be given and reference will be made more particularly to the recovery of fine powdered milk from air containing the same. The air containing the fine particles of material to be removed passes downwardly through the inlet 12 and as it passes from the duct 12 to the chamber 17 through the downwardly flaring cover 13 is sprayed with liquid from the atomizer nozzles or heads 16 which are so arranged as to throw the spray in a direction opposite in general to the direction of flow of the air current and thereby effect a thorough distribution of the spray throughout the air current.

Part of the moisture thus thrown into the air current and part of the moistened particles resulting from such spraying may fall directly to the floor 38 and flow to the outlet 39 or reach the outlet by flowing down the inner surfaces of the side walls of the casing. Other particles of moisture and moistened material will be carried by the air current into the spaces between the blades 22, but due to the arrangement of the blades 22 and the rate of movement of the blades with reference to the velocity of the air current as it passes through the spaces between the blades, the blades will impinge against the particles carried by the air and tend to throw them out of the rotary separator. In the event that the particles are not thrown out directly, they may remain on the blades until a sufficient quantity of material has accumulated and then be thrown off by centrifugal force so as to pass downwardly to the floor 38. It will be seen that the space around the rotary separator serves as a settling zone.

In connection with the manufacture of powdered milk, milk from the supply to be converted into powder is preferably used in the spraying operation and the sprayed material which is discharged through the outlet 39 is returned to the drying apparatus for conversion into powder. Substantially all of the available material in the milk is, therefore, converted into powdered milk and collected for use. The clean air passes downwardly through the lower end or bottom of the rotary separator 17 and through the outlet duct 40 to the fan 65.

In Fig. 4, there is illustrated the upper part of a modified form of apparatus in which the inlet duct 12 is connected with a central opening in a flat annular cover or top 13*a* for the casing 11 and the spray is introduced through a single atomizer head 16 placed on the axial line of the opening in the top 13*a* and at such a height that the spray is thrown upwardly into the air current before it can spread. The spray liquid is supplied to the atomizer head through a pipe 14*a* which may be supported in any suitable manner at the wall of the casing 11 where an air tight seal is provided, and may be supported at the interior of the casing by any suitable means such as a metal strap 70 secured at its ends to the cover 13*a* at opposite sides of the central opening therein and engaging from below the pipe 14*a* near its inner end.

It should be understood that various changes can be made in the method and apparatus and that certain features can be used without others, without departing from the true spirit and scope of the invention.

Having thus described the invention, what I claim as new is:—

1. The method of removing fine particles from air containing the same, which consists in spraying the air with liquid to moisten the particles carried by the air, and then passing the air with the moistened particles radially inwardly between vertically arranged blades acting centrifugally about a vertical axis to oppose the inward passage of air and throw the moistened particles outwardly and moving in timed relation with the flow of air so that the moistened particles will be removed from the air by the blades.

2. The method of recovering and utilizing the normally unrecoverab'e fine particles of soluble powder formed by spraying a liquid containing the necessary material into heated air, which includes flowing the air containing the residual particles, spraying the air with liquid, drawing the air after spraying inwardly toward an axis, removing from the air by resisting the inward movement thereof and by impact and centrifugal force from rotation about said axis the moistened particles and the particles of moisture thus produced, and converting such moistened particles and particles of moisture into such powder.

3. The method of removing fine particles from air by use of a rotary separator closed at one end and open at the other end and at the sides between longitudina' blades inclined with respect to planes passing through the axis of the separator and their longitudinal edges, which includes spraying the air containing the fine particles, passing the air containing moistened particles inwardly between the longitudinal blades and out of the open end of the rotary separator, and rotating the separator to resist the passage of air and to urge material outwardly and at such a speed that each blade will move the distance between two successive blades as quickly as the air containing the moistened particles passes from the outer limit of any space between successive blades to the inner limit of such space, and will impinge against any moistened particles entering the spaces immediately in front of the blades and drive such moistened particles outwardly by impact and centrifugal force.

4. In apparatus for cleaning air containing fine particles, the combination of means for spraying the air to moisten the particles, a rotary separator to remove such moistened particles by impact and centrifugal force from air passed therethrough, means for drawing the air radially into said separator and axially out of the same and means for rotating the separator in a direction to resist the movement of the air therethrough.

5. In apparatus for c'eaning air containing fine particles, the combination of means for spraying the air to moisten the particles, a vertical rotary separator to remove such moistened particles by impact and centrifugal force from air passed inwardly and downwardly therethrough, said separator having a closed top, means for drawing the air through said separator, and a drainage floor having an opening to accommodate the lower end of said separator and to drain to one side of the apparatus all material settling on said floor.

6. In apparatus for cleaning air containing powder in suspension, the combination of a cylindrical chamber in upright position, a vertical inlet duct coaxial with said chamber and above the same, a cover for said chamber having a central opening connected with said inlet duct and flaring downwardly and outwardly from said central opening to permit the air current to spread in passing from the lower end of the duct to the upper end of the chamber, atomizing means arranged to throw spray upwardly and inwardly into the spreading air stream as it passes downwardly through the cover, means for drawing the air downwardly from said chamber, and rotary means to withdraw the moistened powder from the air passing through said chamber.

7. In apparatus for cleaning air containing fine particles in suspension, the combination of a cylindrical chamber in upright position, a vertical inlet duct coaxial with said chamber and above the same, a cover for said chamber having a central opening connected with said inlet duct and flaring downwardly and outwardly from said central opening to the upper end of said chamber to permit the air current to spread gradually, an upright separator in said chamber beneath said duct and having a closed upper end, spraying means including a plurality of atomizer heads arranged in a circle above the upper end of the separator and directed inwardly and upwardly, means for drawing air from said chamber and separator, and means for rotating said separator to reject the moistened particles.

8. In apparatus for cleaning air containing powder in suspension, the combination of a cylindrical chamber in upright position, a vertical inlet duct coaxial with said chamber and above the same, a cover for said chamber having a central opening connected with said inlet and flaring downwardly from said central opening to permit the air current to spread in passing from the lower end of the duct to the upper end of the chamber, atomizing means arranged to throw spray upwardly and inwardly into the spreading air stream as it passes downwardly through the cover, a rotary separator coaxial with said chamber and having at its sides inclined blades between which the air from the chamber passes into the separator and having its lower end open to permit the passage of air therethrough, a drainage floor to receive the material separated from the air, said drainage floor inclining downwardly from the lower end of the separator to the wall of the casing and farther down at one side than at the others, means to draw air downwardly through said chamber and said separator, and means to rotate said separator to reject the material suspended in the air so that it will fall on the drainage floor.

9. In apparatus for cleaning air containing fine particles of powder or the like, the combination of a cylindrical chamber in upright position, a vertical inlet duct coaxial with said chamber and communicating with the upper end thereof, an upwardly directed spray device arranged to divert the air current to the sides of the apparatus, a rotary separator beneath said spray device and having a closed top, vertical blades around its periphery to remove moistened particles from air passing therebetween and an open lower end for the passage of air from the separator, and means to draw air through said chamber and separator.

10. In apparatus for cleaning air containing fine particles of powder or the like, the combination of a cylindrical chamber in upright position, a flat top for said chamber, having a central opening, an inlet duct communicating with the central opening in said top, an upwardly directed atomizer head positioned at the center of said central opening, an upright rotary separator beneath said atomizer head, and means for drawing air from said chamber through said separator.

JOHN STETSON BARNES.